United States Patent [19]
Hirai et al.

[11] Patent Number: 5,477,352
[45] Date of Patent: Dec. 19, 1995

[54] LIQUID CRYSTAL DISPLAY DEVICE WITH LIQUID CRYSTAL DISPERSED OR IMPREGNATED IN A PERFLUORO-TYPE POLYMER OF PERFLUOROALKYL ACRYLATE OR METHACRYLATE

[75] Inventors: Toshiyuki Hirai, Tenri; Shuichi Kozaki, Nara; Fumiaki Funada, Yamatokoriyama, all of Japan

[73] Assignee: Sharp Kaushiki Kaisha, Osaka, Japan

[21] Appl. No.: 65,545

[22] Filed: May 20, 1993

Related U.S. Application Data

[63] Continuation-in-part of Ser. No. 782,500, Oct. 25, 1991, abandoned.

[30] Foreign Application Priority Data

Oct. 31, 1990 [JP] Japan .................................. 2-296263

[51] Int. Cl.⁶ ...................................................... G02F 1/13
[52] U.S. Cl. ................................................ 359/52; 359/51
[58] Field of Search .......................................... 359/51, 52

[56] References Cited

U.S. PATENT DOCUMENTS

| | | | |
|---|---|---|---|
| 4,101,207 | 7/1978 | Taylor | 359/81 |
| 4,818,070 | 4/1989 | Gunjima et al. | 359/94 |
| 5,093,735 | 3/1992 | Doane et al. | 359/52 |
| 5,113,272 | 5/1992 | Reamey | 359/52 |

FOREIGN PATENT DOCUMENTS

| | | |
|---|---|---|
| 0272585 | 6/1988 | European Pat. Off. |
| 0304153 | 2/1989 | European Pat. Off. |
| 0362776 | 4/1990 | European Pat. Off. |

*Primary Examiner*—Anita Pellman Gross
*Attorney, Agent, or Firm*—David G. Conlin; Peter F. Corless

[57] ABSTRACT

A liquid crystal display device comprising: a first substrate having a signal electrode and a scanning electrode insulated from each other through an insulating layer, said first substrate being further provided with a switching transistor and a pixel electrode both in association with an intersection of said signal electrode and said scanning electrode; a liquid crystal layer containing a liquid crystal material of a positive dielectric anisotropy dispersed or impregnated in a transparent fluoro-type polymer of a fluoroalkyl acrylate or metacrylate or its copolymer with an alkyl acrylate or metacrylate; and a second substrate having a counter electrode to be placed at least opposite to said pixel electrode, said first and second substrate being disposed as opposed to each other so as to sandwich said liquid crystal layer.

12 Claims, 4 Drawing Sheets

FIG.1(a)
FIG.1(b)
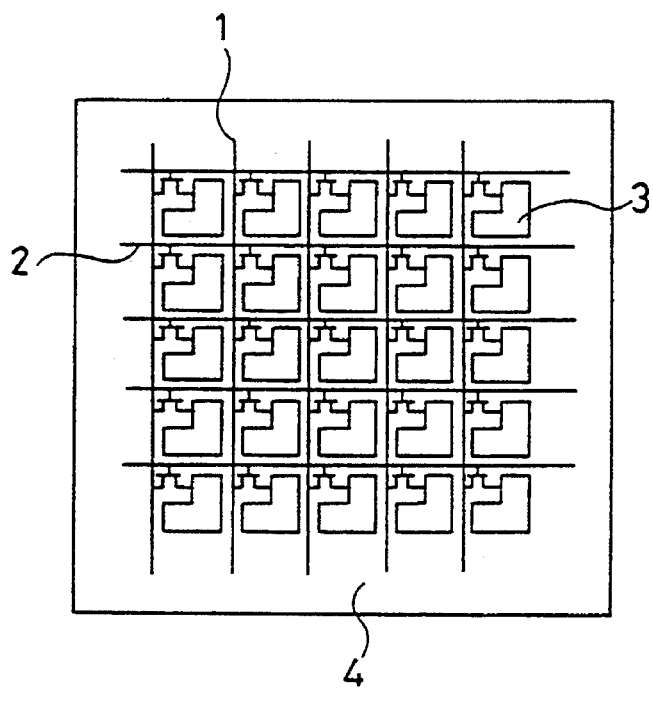
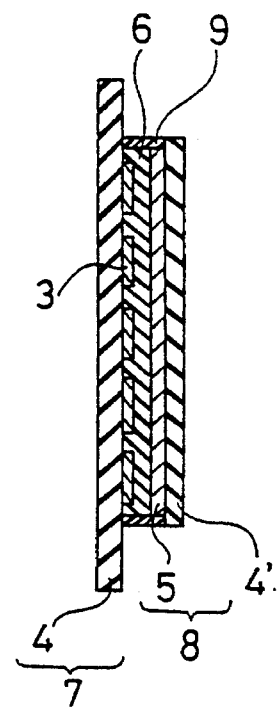
FIG.2
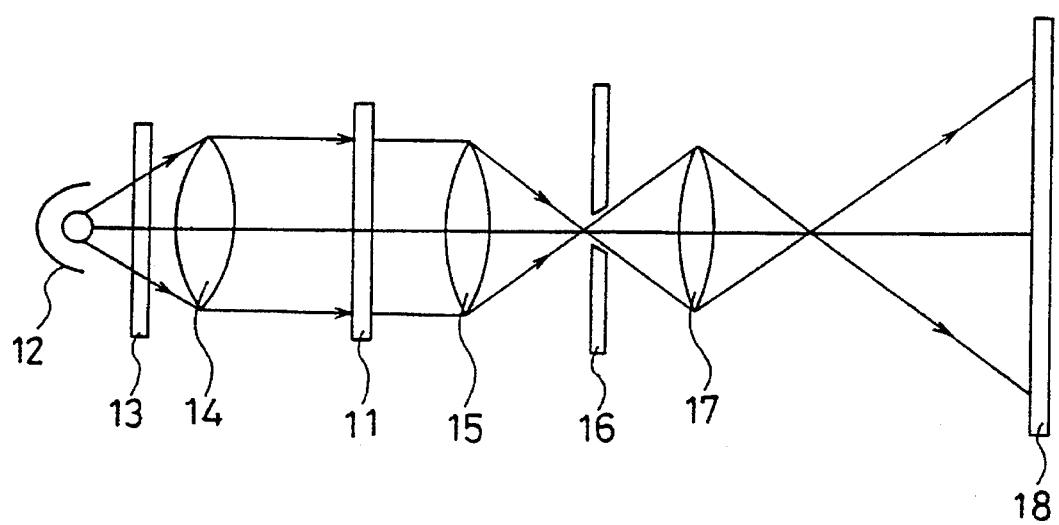

LIQUID CRYSTAL DISPLAY DEVICE WITH LIQUID CRYSTAL DISPERSED OR IMPREGNATED IN A PERFLUORO-TYPE POLYMER OF PERFLUOROALKYL ACRYLATE OR METHACRYLATE

This is a continuation-in-part of application Ser. No. 07/782,500 filed on Oct. 25, 1991, now abandoned.

FIELD OF THE INVENTION

The present invention relates to a liquid crystal display device.

RELATED ART

Conventionally, liquid crystal display devices of the twisted nematic (TN) type and the supertwisted nematic (STN) type have been practically used as display devices utilizing electrooptic effects. As well, display devices using ferro-electric liquid crystals has also been proposed. The liquid crystal display devices as noted above need a polarizer as well as an orientation treatment.

On the other hand, there have been proposed liquid crystal display devices which do not need a polarizer and which utilize liquid crystal scattering effects such as dynamic scattering (DS) effect and phase change (PC) effect. For instance, there has recently been proposed a display device in which liquid crystal molecules are dispersed in a polymer material to obtain the liquid crystal scattering effects. Such a device does not need a polarizer nor orientation treatment.

For example, Japanese Announced Patent Publication No. 501631/1983 has proposed a liquid crystal display device which is fabricated by: Suspending a nematic liquid crystal material of positive dielectric anisotropy in an aqueous solution of polyvinyl alcohol to form an emulsion; applying the emulsion to a substrate having transparent electrodes; evaporating water off from the applied emulsion to form a film having the liquid crystal material dispersed in the PVA; and bonding another substrate having transparent electrodes to the former substrate to complete a display device.

Further, Japanese Announced Patent Publication No. 502128/1986 has proposed a liquid crystal display device which is fabricated by: mixing and dispersing a liquid crystal material of positive dielectric anisotropy together with a curing agent in an epoxy resin; sandwiching the mixture by means of a pair of opposed substrates having transparent electrodes; and heating to cure the epoxy resin to complete a display device.

In addition, there have been proposals of using a well-known polymer of the acryl- or urethane type other than the above-mentioned polymers as a dispersion medium in a liquid crystal display device.

The liquid crystal device in which a liquid crystal material of positive dielectric anisotropy is dispersed in a typical transparent polymer such as of polyvinyl alcohol type, epoxy type, acryl type or urethane type cannot be static-driven and hence cannot be represented by an ideal equivalent circuit (FIG. 4) exhibiting good display properties such as clear contrast. This is because in such a device a large resistance element r (equivalent to a resistance $R_{LC}$) originated from conductive impurities introduced from exterior or produced by decomposition of a liquid crystal compound is present in a liquid crystal layer 6 acting as a capacitor $C_{LC}$, as shown in FIG. 6. For this reason the liquid crystal layer electrically charged by a voltage $V_D$ gradually discharges with time, and hence a voltage of effective value applied to the liquid crystal layer 6 lowers. The liquid crystals exhibit cumulative response effect in response to an applied voltage, and depends therefore upon the voltage of effective value applied thereto, resulting in poorer display contrast with lower voltage of effective value. So, the extent of decrease in voltage of effective value is evaluated using a parameter which is defined herein as a voltage holding ratio. The voltage holding ratio is defined as a ratio of the actual effective value of the voltage $V_D$ to the effective value of the voltage $V_D$ in the case the resistance in the liquid crystal layer is assumed to be infinitely great.

As can be understood from Table 1, the liquid crystal display devices using the above conventional transparent polymers have a problem of low voltage holding ratio, leading to poor contrast. In addition, the voltage holding ratios (at 25° C.) shown in Table 1 were those of the devices having been just fabricated, and which rates were proved to decrease with time.

TABLE 1

| | Polyvinyl alcohol-type polymer | Epoxy-type polymer | Acryl-type polymer | Urethane-type polymer |
|---|---|---|---|---|
| Voltage holding ratio (%) | 60 | 35 | 73 | 70 |

SUMMARY OF THE INVENTION

The present invention is to provide a liquid crystal display device of a high voltage holding ratio which assures a superior display contrast.

Thus, the present invention provides a liquid crystal display device comprising:

a first substrate having a signal electrode and a scanning electrode insulated from each other through an insulating layer, the first substrate being further provided with a switching transistor and a pixel electrode both in association with an intersection of the signal electrode and the scanning electrode;

a liquid crystal layer containing a liquid crystal material of positive dielectric anisotropy dispersed or impregnated in a transparent fluoro-type polymer of a fluoroalkyl acrylate or methacrylate or its copolymer with an alkyl acrylate or methacrylate; and a second substrate having a counter electrode to be placed at least opposite to the pixel electrode, the first and second substrate being disposed as opposed to each other so as to sandwich the liquid crystal layer.

According to the present invention, the fluoro-type polymer or copolymer can cause the liquid crystal layer to augment the voltage holding ratio and reduces the amount of electricity discharged therefrom, leading to a reliable liquid crystal display device with good display properties. Also, the fluoro-type polymer (or copolymer) is well compatible with the liquid crystal material and can be formed by photo-setting a polymerizable composition.

BRIEF DESCRIPTION OF THE DRAWINGS

FIGS. 1(a) and 1(b) are views for schematically illustrating a matrix-type liquid crystal display device fabricated in the embodiment of the invention;

FIG. 2 is a view for schematically illustrating a projection apparatus using the matrix-type liquid crystal display device shown in FIGS. 1(a) and 1(b);

DETAILED DESCRIPTION OF THE PREFERRED EMBODIMENTS

Figure 3A:
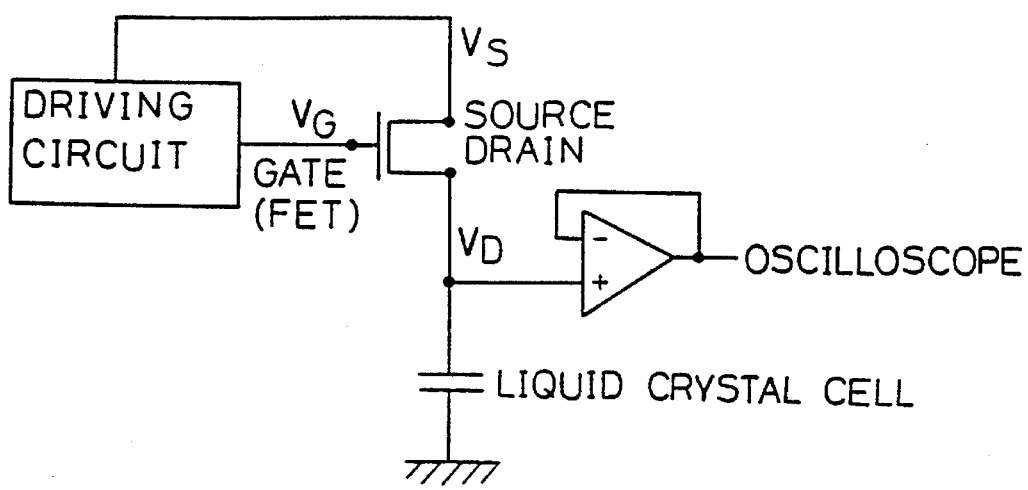
FIG. 3 is a view for schematically illustrating a system for measuring a voltage holding ratio of liquid crystal.

In the present invention, the liquid crystal layer has a predetermined amount of the liquid crystal material of positive dielectric anisotropy dispersed in the transparent fluoro-type polymer or copolymer.

The above fluoro-type polymer or copolymer is preferably hard to polarize and to generate ions while being chemically inert and superior in dielectric properties. The fluoro-type polymers include those derived from fluoroalkyl acrylates of methacrylates, in which the alkyl moiety has 1–16 carbon atoms, preferably 2–12 carbon atoms and is preferably per-fluorated. The fluoro-type copolymers include those derived from the above fluoroalkyl acrylate or methacrylate with alkyl acrylate or methacrylate whose alkyl moiety has 1–16 carbon atoms preferably 2–8 carbon atoms. Specific example of the fluoro-type polymers or copolymers include polyperfluorooctyl methacrylate, poly-β-(perfluorooctyl)ethyl acrylate, polytrifluoroethyl acrylate, poly-2,2,3,3-tetrafluoropropyl acrylate, polyper-fluorooctyl acrylate, perfluoroethyl acrylate.2-ethyl-hexyl acrylate copolymer, 2,2,3,3-tetrafluoropropyl acrylate.2-ethylhexyl acrylate copolymer and perfluorooctyl acrylate.2-ethylhexyl acrylate copolymer, and the like.

As the above liquid crystal material of positive dielectric anisotropy may be used a known liquid crystal material such as ZLI-3219, ZLI-4718, SLI-4749, ZLI-2792, ZLI-4801-000 and ZLI-4801-001 (products of MERCK and CO., Inc.), E7 or E8 (product of BDH CO.), GR-63 (product of CHISSO CORPORATION) or the like. Such a liquid crystal material is used in an amount of 100–1900 weight parts relative to 100 weight parts of the transparent fluoro-type polymer, preferably 150–900 weight parts relative thereto.

Dispersing the liquid crystal material in the transparent fluoro-type polymer (or copolymer) can be conducted, for example, in accordance with the following methods.

1. Filling a homogeneous mixture of the liquid crystal material and a polymerizable composition being capable of forming the fluoro-type polymer or copolymer i.e., containing the mononers and a light sensitive hardner, between the first and second substrates, then polymerizing and curing the polymerizable composition thereby dispersing the liquid crystal material in the transparent fluoro-type polymer. As the polymerizable composition may be used β-(perfluorooctyl)ethyl acrylate or the like mononer and a light sensitive hardner known in the art. The first and second substrates can be fabricated in accordance with a known method.

2. Forming previously a porous material composed of the transparent fluoro-type polymer (or copolymer) between the first and second substrates, then impregnating the liquid crystal material in the porous material. The formation of the porous material can be carried out in accordance with a known method.

3. Mixing the fluoro-type polymer (or copolymer) the liquid crystal material and an organic solvent to form a solution, applying the solution to the first and/or second substrate, and then evaporating the solvent off thereby dispersing the liquid crystal material in the fluoro-type polymer.

EXAMPLES

Hereinafter, examples of the invention will be detailed with reference to the drawings. It should be understood that the examples are not limitative of the invention.

Test conditions is as follows.

1) Voltage holding ratio applied voltage: 5 V holding duration: 16.7 ms

2) Saturation voltage

Applied voltage was measured when the light transmittance assumed $(T_{100}-T_0) \times 0.9$, where $T_{100}$ is a light transmittance under application of 50 V (sufficiently higher than required), $T_0$ is a light transmittance when voltage is not applied.

3) Hysteresis

Measured was a difference between a voltage under decreasing process $V_{50D}$ and a voltage under increasing process $V_{50I}$ when the light transmittance assumed $(T_{100}-T_0) \times 0.5$.

4) Critical surface tension

Angle of contact was measured by using a standard wetting index liquid, and a surface tension at which the angle of contact assumed 0° was extrapolated to find critical surface tension.

[EXAMPLE 1]

Preparation of a solution for liquid crystal layer to be applied to substrate

A solution for liquid crystal layer was prepared by homogeneously mixing β-(perfluorooctyl)ethyl acrylate as a fluoro-containing acrylic monomer (24 weight parts), 2-ethylhexyl acrylate (6 weight parts), a liquid crystal material of positive dielectric anisotropy (ZLI-3219 of MERCK, 70 weight parts) and a photopolymerization initiator (DAROCURE 1173 of MERCK, 1 weight part).

Formation of a liquid crystal layer

As shown in FIGS. 1(a) and 1(b), a transparent insulating substrate 4 made of a glass free of birefringence was formed in a matrix array, with bus lines such as a signal electrode 1 and a scanning electrode 2, together with a pixel electrode 3 made of ITO and switching transistor 10 associated with the pixel electrode 3 to constitute a display electrode substrate 7 (first electrode) for active matrix driving. As the above switching transistor 10 used was an a-Si thin film transistor (TFT).

In turn, as shown in FIGS. 1(a) and 1(b), the first substrate 7 and the second substrate 8 are bonded together via 10 μm-spacers with the sealant 6 of epoxy resin, with providing an injection inlet so that the pixel electrode of the first substrate and the counter electrode of the second substrate can face to each other. Subsequently, the solution for liquid crystal layer obtained in the Example was injected between the substrates by low pressure injection method, then irradiated with UV ray of about 30 mW/cm$^2$ for 60 sec. to cure the solution, completing a liquid crystal display device with a light crystal material dispersed in the fluoro-type polymer.

Operation of the liquid crystal display device

Figure 4:
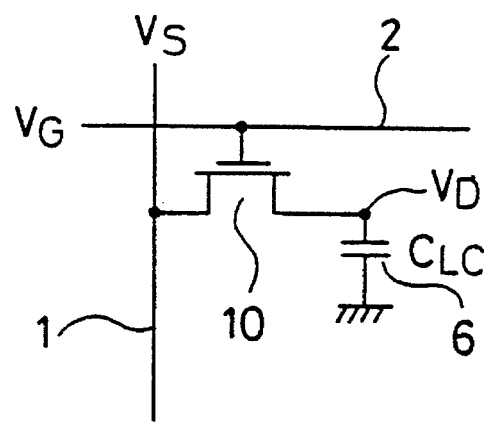
FIG. 4 is a diagram of an ideal equivalent circuit for one pixel.
Figure 5A:
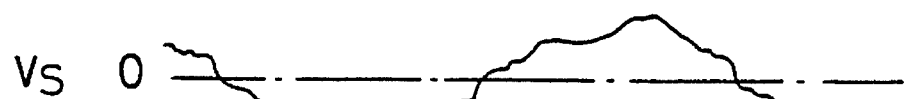
FIGS. 5(a), 5(b) and 5(c) are diagrams of driving voltage waveforms $V_S$, $V_G$ and $V_D$, respectively, with respect to the ideal equivalent circuit shown in FIG. 4.
Figure 5B:
Figure 5C:
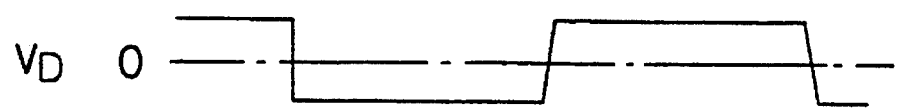
Figure 6:
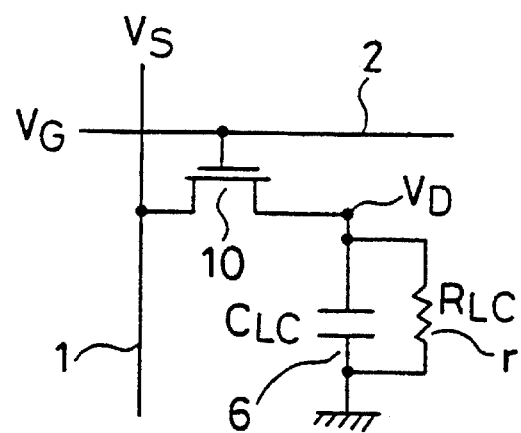
FIG. 6 is a diagram of an actual equivalent circuit for one pixel.
Figure 7A:
FIGS. 7(a), 7(b) and 7(c) are diagrams of driving voltage waveforms $V_S$, $V_G$ and $V_D$, respectively, with respect to the actual equivalent circuit shown in FIG. 6.
Figure 7B:
Figure 7C:
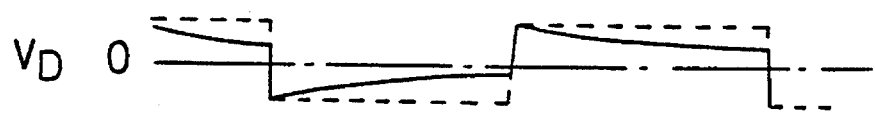

When attention is directed to one pixel, its equivalent circuit and driving voltage waveforms are respectively shown in FIGS. 4 and 5(a)–(c), wherein when a scanning signal voltage $V_G$, applied to the scanning electrode 2, causes the transistor 10 to be turned ON, the liquid crystal layer 6 (which equivalently corresponds to a capacitor $C_{LC}$) is electrically charged by a signal voltage $V_S$, and the charge is maintained there until the transistor is turned ON again. As a result, the liquid crystal layer 6 is applied with a voltage $V_D$ and thus good display properties can be obtained as in the case of static driving.

Measurement of voltage holding ratio

Figure 3A:
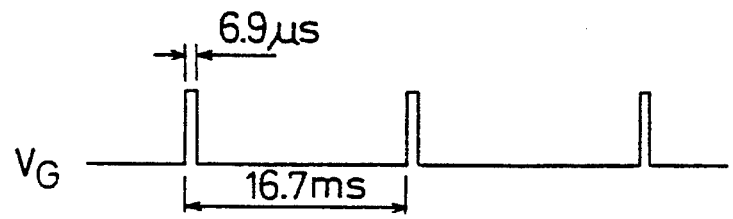
Figure 3A:
Figure 3A:
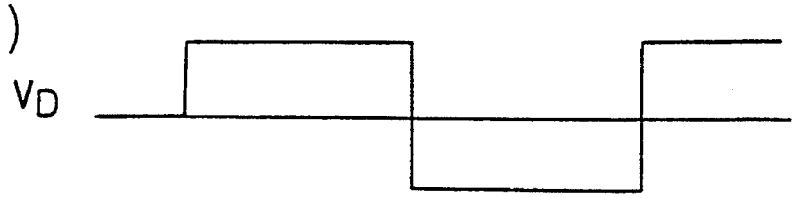

The voltage holding ratio of the above liquid crystal cell was measured using a holding ratio measuring system shown in FIG. 3. This system comprised a switching transistor (FET) and driving circuit for applying voltage across the electrodes and a circuit for measuring the amount of electric charge discharged from the liquid crystal cell was 95.4. at 25° C.

As well, voltage holding ratios were measured with respect to liquid crystal cells respectively using trifluoroethyl acrylate, 2,2,3,3-tetrafluoropropyl acrylate and perfluorooctyl acrylate as a fluoro-containing vinyl monomer instead of using the above perfluorooctylethyl acrylate. These cells also exhibited high voltage holding ratios as shown in Table 2.

TABLE 2

| Fluoro-containing vinyl monomer | Voltage holding ratio (%) at 25° C. |
| --- | --- |
| Trifluoroethyl acrylate | 94.3 |
| 2,2,3,3-Tetrafluoropopyl acrylate | 94.7 |
| Perfluorooctyl acrylate | 95.5 |

<Comparative Example 1>

A liquid crystal display device was fabricated in the same manner as in Example 1 except that a solution for liquid crystal layer to be applied to the substrate was prepared by completely dissolving 8 weight parts of polyvinyl alcohol in 80 weight parts of distilled water, adding to the solution 12 weight parts of the liquid crystal material ZLI-3219, and mixing and stirring the mixture with a blender mill to give a milky white dispersion of liquid crystal in an aqueous solution of polyvinyl alcohol.

The liquid crystal display device thus fabricated exhibited 60% voltage holding ratio.

Likewise, holding ratio of a liquid crystal display devices using an epoxy-type polymer, acryl-type polymer and an urethane-type polymer were measured. The result of the measurement was same as shown in the above Table 1.

[EXAMPLE 2]

FIG. 2 illustrates an arrangement of a projection apparatus using the liquid crystal display device fabricated in Example 1, wherein light from a projection light source 12 goes through a heat ray cutting filter 13, is made parallel by a condenser lens 14, transmits the liquid crystal display device 11, condenses by at a lens 15, goes through a diaphragm 16, and is projected onto a screen 18 by a projection lens 17, creating an image thereon.

Such a projection apparatus using the liquid crystal display device provided with a switching transistor exhibited high contrast (50:1, or more), offering a high display quality. Further, an agning test by powering on at 50° C. for 500 hours revealed that the projection apparatus maintained its high display quality free from display irregularities. The above results were true of a projection apparatus using a liquid crystal display device having a switching transistor wherein a spongy porous material of a fluoro-type polymer was impregnated with the liquid crystal material.

In contrast, the case of using the liquid crystal display device of Comparative Example 1 wherein polyvinyl alcohol was used as a dispersion medium offered unsatisfactory display quality. What was even worse, the aging test by powering on revealed a decrease in contrast and occurrence of display irregularities.

[EXAMPLE 3]

A solution for liquid crystal layer was prepared by homogeneously mixing perfluorooctylethyl acrylate as a fluoro-containing acrylic monomer (24 weight parts), 2-ethyl-hexyl acrylate (6 weight parts), a fluoro-type liquid crystal material of positive dielectric anisotropy (ZLI-4792 of MERCK, 70 weight parts) and a photopolymerization initiator (DAROCURE 1173 of MERCK, 1 weight part).

The solution was injected into the cell fabricated in Example 2 and cured by irradiating UV rays, completing a liquid crystal cell for evaluation. This cell exhibited 98.8% voltage holding ratio at 25° C.

As well, voltage holding ratios were measured with respect to cells for evaluation respectively using ZLI-4718, ZLI-4749, ZLI-4801-000 and ZLI-4801-001 (products of MERCK) as a fluoro-type liquid crystal material instead of using the above ZLI-4792. These cells also exhibited high voltage holding ratios as shown in Table 3.

TABLE 3

| Fluoro-type liquid crystal material | Voltage holding ratio (%) at 25° C. |
| --- | --- |
| ZLI-4718 | 98.0 |
| ZLI-4749 | 98.3 |
| ZLI-4801-000 | 98.8 |
| ZLI-4801-001 | 98.7 |

In the same manner as in Example 2, a liquid crystal display device was fabricated by injecting the above solution for liquid crystal layer and curing it by means of irradiation of UV rays of about 30 mW/cm$^2$ for 60 sec. to disperse the liquid crystal material in a fluoro-type polymer.

The liquid crystal display device thus obtained was applied to the projection apparatus as in Example 2. Such an apparatus exhibited high contrast and high display quality. Even after having been subjected to the aging test with powering on for 500 hours at 50° C., the apparatus maintained its high contrast property and display quality without causing display irregularities.

[EXAMPLES 4, 5 AND 6]

Mixed were 2-ethylhexylacrylate [2 EHA, product of NIPPON KAYAKU CO., LTD], β-(perfluorooctyl)ethylacrylate [FA 108, product of KYOEI CORPORATION] and diacrylic monomer [R 648, product of NIPPON KAYAKU CO., LTD.] at ratios shown in Table 4 to give monomer mixtures.

TABLE 4

| Example | Ratio (weight %) | | |
|---|---|---|---|
| | 2 EHA | R 684 | FA 108 |
| 4 | 72 | 20 | 8 |
| 5 | 64 | 20 | 16 |
| 6 | 54 | 20 | 26 |

The monomer mixture (3 g) was mixed at 80° C. with 1.2 g of a liquid crystal material (ZLI-4792, product of MERCK CORPORATION, An=0.094, n=1.573) and 0.045 g of a photoinitiator (IRGACURE 184, product of Ciba-Geigy CORPORATION) to give homogeneous mixtures (Examples 4, 5 and 6, respectively).

The resulting mixture (Example 4, 5 or 6) was injected into a cell having a pair of opposed glass substrates each formed with an ITO film (500 Å in thickness) and spaced with a 12-μm spacer. The cells were each irradiated with ultraviolet rays (365 nm) at an intensity of 50 mW/cm$^2$ with use of a high-pressure mercury lamp to polymerize the monomer component of the mixtures and baked for two hours, resulting in liquid crystal display devices.

The obtained liquid crystal devices were measured with respect to their voltage holding ratio, light transmittance, saturation voltage and hysteresis. Results of the measurement are shown in Table 5 (attached hereto).

As can be understood from Table 5, the liquid crystal display devices are excellent in voltage holding ratio and exhibit satisfactory saturation voltage and hysteresis.

TABLE 5

| Example No. | Voltage holding ratio (%) | Light transmittance | | Saturation voltage (V) | Hysteresis (V) | Refraction index | Critical surface tension (dynes/cm) |
|---|---|---|---|---|---|---|---|
| | | T0 | T100 | | | | |
| 4 | 97.5 | 42.0 | 80.8 | 9.5 | <0.1 | 1.45 | 34 |
| 5 | 98.2 | 45.7 | 79.6 | 8.1 | <0.1 | 1.46 | 30 |
| 6 | 97.7 | 49.5 | 79.8 | 7.5 | <0.1 | 1.46 | 29 |

As has been described above, the liquid display device of the present invention in which used are a switching transistor such as a-SiTFT and p-SiTFT and a liquid crystal layer composed of a stable and chemically inert fluoro-type polymer and a liquid crystal material of positive dielectric anisotropy dispersed therein can assure a high voltage holding ratio, offering a high display quality and reliability.

What is claimed is:

1. A liquid crystal display device comprising:
   a first substrate having a signal electrode and a scanning electrode insulated from each other through an insulating layer, said first substrate being further provided with a switching transistor and a pixel electrode both in association with an intersection of said signal electrode and said scanning electrode;
   a liquid crystal layer containing a liquid crystal material of a positive dielectric anisotropy dispersed or impregnated in a transparent perfluoro-type polymer of a perfluroalkyl acrylate or methacrylate or its copolymer with an alkyl acrylate or methacrylate; and
   a second substrate having a counter electrode to be placed at least opposite to said pixel electrode;
   said first and second substrate being disposed as opposed to each other so as to sandwich said liquid crystal layer.

2. A liquid crystal display device as set forth in claim 1, wherein said liquid crystal layer contains 100–1900 weight parts of said liquid crystal material per 100 weight parts of said transparent perfluoro-type polymer or copolymer.

3. A liquid crystal display device as set forth in claim 2, wherein said liquid crystal layer contains 150–900 weight parts of said liquid crystal material per 100 weight parts of said transparent perfluoro-type polymer or copolymer.

4. A liquid crystal display device as set forth in claim 1, wherein said liquid crystal layer is formed by filling a homogeneous mixture of said liquid crystal material and a polymerizable composition being capable of forming said perfluoro-type polymer or copolymer in the space between said first and second substrates, and then polymerizing and curing the polymerizable composition thereby dispersing said liquid crystal material in the resulting transparent perfluoro-type polymer or copolymer.

5. A liquid crystal display device as set forth in claim. 4, wherein said polymerizable composition comprises β-(perfluorooctyl )ethyl acrylate.

6. A liquid crystal display device as set forth in claim 4, wherein said polymerizable composition is polymerized by radiating ultra violet ray.

7. A liquid crystal display device as set forth in claim 1, wherein said liquid crystal layer is formed by forming previously a porous material composed of said transparent perfluoro-type polymer or copolymer between said first and second substrates, and then impregnating said liquid crystal material in said porous material.

8. A liquid crystal display device as set forth in claim 1 wherein the perfluoro-type polymer is derived from fluoroalkyl acrylates or methacrylates having an alkyl moiety containing from 1 to 16 carbon atoms.

9. A liquid crystal device as set forth in claim 1 wherein the perfluoro-type polymer is derived from fluoroalkyl acrylates of methacrylates having an alkyl moiety containing from 2–12 atoms.

10. A liquid crystal display device as set forth in claim 1 wherein the perfluoro-type copolymer is derived from fluoroalkyl acrylate or methacrylate having an alkyl moiety having from 1 to 16 carbon atoms.

11. A liquid crystal display device as set forth in claim 1 wherein the perfluoro-type copolymer is derived from fluoroalkyl acrylate or methacrylate having an alkyl moiety having from 2 to 8 carbon atoms.

12. A liquid crystal display device as set forth in claim 1 wherein the perfluoro-type polymer or copolymer comprises polyperfluorooctyl methacrylate, poly-β-(perfluorooctyl)ethyl acrylate, polyper-fluorooctyl acrylate, perfluoroethyl acrylate.2-ethyl-hexyl acrylate copolymer, or perfluorooctyl acrylate.2-ethylhexyl acrylate copolymer.

\* \* \* \* \*